United States Patent Office 3,414,550
Patented Dec. 3, 1968

3,414,550
CHELATING RESINS FROM EPOXYALKYL
ACRYLATE POLYMERS
Gaetano F. D'Alelio, South Bend, Ind., assignor, by mesne assignments, of seventy-five percent to said D'Alelio and twenty-five percent to Walter J. Monacelli, Cleveland Ohio
No Drawing. Continuation-in-part of application Ser. No. 28,561, May 12, 1960. This application May 13, 1965, Ser. No. 455,616
10 Claims. (Cl. 260—86.7)

ABSTRACT OF THE DISCLOSURE

The disclosure of this application involves a cross-linked chelating resin having the formula:

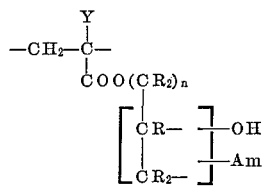

wherein Y, R, $n$ and Am are as defined hereinafter, which is illustrated by the method of preparing such polymers which comprises the reaction of a cross-linked polymer having a repeating unit of the acrylate type with an oxirane radical in the ester group thereof, said oxirane structure being reacted with an amino acid of the type described hereinafter. A typical polymer is one having repeating units derived by the polymerization of glycidyl acrylate thereafter having the oxirane ring of the glycidyl group reacted with an aminoacid, such as one having the radical —N(CH$_2$CHOOH)$_2$ therein.

---

This application is a continuation-in-part of copending application Ser. No. 28,561 filed May 12, 1960 which issued as Patent No. 3,228,920 on Jan. 11, 1966.

This invention relates to the production of chelating resins and to new processes for preparing chelating resins. Generally, it is concerned with preformed crosslinked polymers having pendant coordination groups attached to the chain and to the process of preparing such polymers. More particularly, it deals with reacting (1) an organic compound (A) having (a) at least one reactive hydrogen and (b) at least one coordination group with (2) a cross-linked acrylic ester polymer having functional oxirane,

groups in its ester structure.

One object of the invention is to provide an improved and economical method of preparing chelating polymers. Another object is to prepare chelating polymers with good physical properties. A still further object of the invention is to tailor-make a wide variety of new chelating resins. Further objects and advantages of the invention will become apparent as the description of the invention proceeds.

The object of this invention has been achieved by reacting crosslinked polymers having reactive functional oxirane groups mentioned hereinabove with an organic compound containing an active (reactive) hydrogen and at least one coordination group. Such compounds are termed coordination compounds. When such compounds have more than one coordination group or position, ring formation can occur upon coordination with metal ions and such compounds are known as chelating compounds.

However, when such compounds have only one coordination group or position and they are reacted with cross-linked polymers to become attached to such a polymer, the polymer will have a multiplicity of such coordination groups, thereby resulting in a chelating polymer. The coordination compounds used in the practice of this invention are substituted organic compounds having at least one active hydrogen and a coordination group selected from the class consisting of primary amino groups, —NH$_2$; secondary amino groups,

in combination with a salt-forming carboxy, —COOH group.

Typical coordination compounds of the kind mentioned are the amino acids, such as glycine, NH$_2$CH$_2$COOM; are the amino acids, such as glycine, NH$_2$CH$_2$COOM;
alanine, CH$_3$CH(NH$_3$)COOM;
serine, HOCH$_2$CH(NH$_2$)COOM;
cystene, NSCH$_2$CH(NH$_2$)COOM;
aminobutyric acid CH$_3$CH$_2$CH(NH$_2$)COOM;
threonine, CH$_2$CH(OH)CH(NH$_2$)COOM;
valine (CH$_3$)$_2$CHCH(NH$_3$)COOM;
norvaline, CH$_3$CH$_3$CH$_2$CH(NH$_2$)COOM;
isovaline,

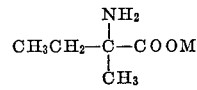

methionine, CH$_2$SCH$_2$CH$_2$CH(NH$_2$)COOM;
leucine, (CH$_3$)$_2$CHCH$_2$CH(NH$_2$)COOM;
aspartic acid,

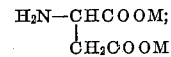

glutamic acid,

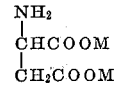

lysine, NH$_2$(CH$_2$)$_4$CH(NH$_2$)COOM;
1,2-diaminopropionic acid,

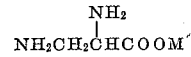

aminopimelic acid, HOOC(CH$_2$)CH(NH$_2$)COOM;
betaaminovaleric acid, CH$_3$CH$_2$CH(NH$_2$)CH$_2$COOM;
hydroxyglycine,

NH$_2$CH$_2$CH$_2$(OH)CH$_2$CH$_2$CH(NH$_2$)COOM hydroxyethyl glycine, HOCH$_2$CH$_2$NHCH$_2$COOM;
aminoethyl glycine, NH$_2$CH$_2$CH$_2$NHCH$_2$COOM;
iminodiacetic acid, HN(CH$_2$COOM);
iminodipropionic acid, HN(CH$_2$CH$_2$COOM)$_2$;
aminoethyliminoacetic acid,

H$_2$NCH$_2$CH$_2$N(CH$_2$COOM)$_2$ hydroxyethyliminodiacetic acid,

HOCH$_2$CH$_2$N(CH$_2$COOM)$_2$ hydroxypropyliminodiacetic acid,

HO(CH$_2$)$_3$N(CH$_2$COOM)$_2$ as well as 3-aminotyrosine, canavanine, 3-4-dihydroxyl-phenylalanine, ethionine, ethionine sulfone, citrulline, creatine, creatinine, cysteic acid, cystine, dibromothyronine, glycocyanine, histidine, homocystine, hydroxyproline, methyl-histidine, pennicillamine, pyroglutamic acid, thienylalanine, carboxymethyl aspartic acid, etc., wherein M represents H for the free acid as well as ammonium bases and metal, and lower alkyl and aryl radicals which can be used in the reaction and after the reaction hydrolyzed to the free acid or metal or ammonium salts.

Amino acids preferred in the practice of this invention are the aliphatic aminoacids having no more than about 20 carbon atoms therein, and having an amino group separated from a carboxylic group by no more than 2 carbon atoms. The aminoacids and their derivatives can have a plurality of amino and carboxylic groups therein and also can contain other functional groups therein which do not interfere with the addition of the amino group to the epoxy group, but in some cases even may enhance the chelating tendencies of the resultant products. Such amino acids are described more fully in applicant's copending application, Ser. No. 28,558, filed May 12, 1960, now Patent No. 3,214,413.

Compounds of this type can be defined by the term HAm wherein H is an active (replaceable) hydrogen and Am is the residue of the aminoacid.

The acrylic esters containing the oxirane group from which the crosslinked polymers are prepared and which are reacted with the aminoacids of the kind described above have the formula

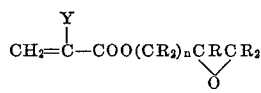

wherein Y represents a member selected from the group consisting of H, CH$_3$, Cl and CN and $n$ represents a numerical value of one to eight and R represents hydrogen or a lower alkyl group.

The oxirane containing crosslinked polymers are prepared by copolymerizing the acrylic esters monomers (A) of the formula

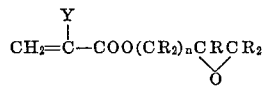

with a crosslinking monomer (B) that is a monomer having a multiplicity of vinyl, vinylene or vinylidene groups.

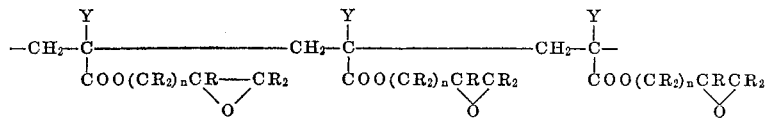

Monomers (A) are prepared readily by esterifying the corresponding acid chloride

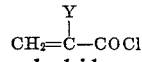

or the corresponding anhydride

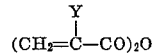

with the hydroxyepoxyalkanes

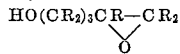

or by reacting the potassium salt of the corresponding acid

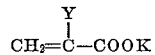

with the corresponding chloroepoxyalkane. For purposes of economy due to commercial availability, the glycidyl acrylic esters,

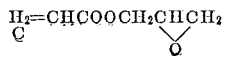

and

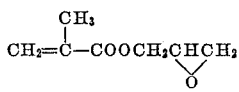

are the preferred acrylates for the practice of this invention. Other useful acrylic esters are

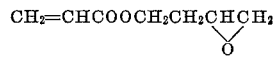
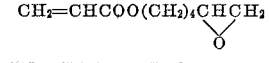
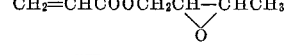
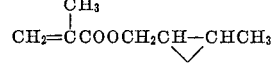
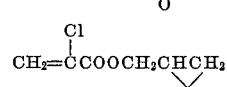
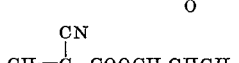
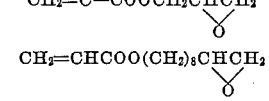
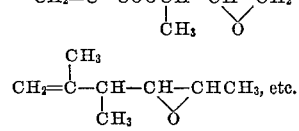

By copolymerizing such monomers with a crosslinking monomer, as for example, with divinyl benzene, there is obtained a crosslinked polymer having the structure of the type

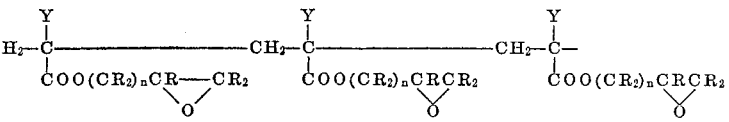

with the aminoacid compounds, designated as HAm above react by opening of the oxirane ring, thus

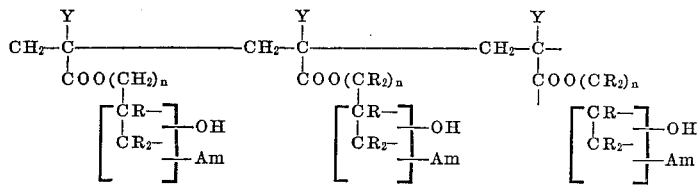

A few illustrative examples of crosslinking monomers, that is, monomers having a multiplicity of vinyl, vinylene, or vinylidene groups are divinylbenzene, divinylnaphthalene, vinyl isopropenyl benzene, vinyl allyl benzene, diisopropenyl benzene, diallyl benzene; the polyunsaturated esters, such as ethylene glycol diacrylate, ethylene glycol dimethacrylate, trimethylene glycol dimethacrylate, diallyl itaconate, glycol maleate, diallyl succinate, divinylphthalate, diallyl maleate; the polyunsaturated ethers, such as divinyl ether, trimethylene glycol divinyl ether, hydroquinone divinyl ether, catechol divinyl ether, resorcinol divinyl ether, hydroquinone diallyl ether, catechol diallyl ether, resorcinol diallyl ether, vinyl allylphenyl ether, vinyl vinylphenyl ether, allyl vinylphenyl ether, vinyloxyvinyl benzoate, vinyloxy-allyl benzoate, allyloxy allylbenzoate; the polunsaturated amides, such as ethylene diacrylamide, ethylene dimethacrylamide, N-vinylacrylamide, N,N'-divinylphthalic diamide, N,N'-diallylphthalamide, etc., and other polyunsaturated modifiers, such as vinyl phenyl-acrylate, 2-isopropenyl-5-acryloxynaphthalene, vinyl-3,5-diallyloxy, palmitate, etc.

The crosslinking monomers (B) can be used alone or in conjunction with each other or with other monomers having one vinyl, vinylene, or vinylidene group, such as vinyl chloride, vinylacetate, vinylpropionate, vinylbutyrate, vinylstearate, acrylonitrile, methacrylonitrile, vinylidene chloride, vinylene cyanide, α-chloroacrylonitrile, acrylic acid, the acrylic esters, such as the methyl, ethyl, propyl, butyl, etc., acrylates; methacrylic acid and its esters, such as the methyl, ethyl, propyl, butyl, hexyl, phenyl, etc. methacrylates; itaconic anhydride, itaconic acid and their mono- and di-esters, such as the methyl, ethyl, propyl, etc. esters; the acrylic, methacrylic, chloroacrylic, and the cyanoacrylic amides, N-alkyl amides, N, N-dialkyl amides; the alkenylaryl compounds, such as styrene, the monomethyl styrenes, the dimethyl styrenes, alpha-methyl styrenes, the mono, di- and trichlorostyrenes, the o-, m-, and p-acetoamido styrenes; vinyl naphthalene, vinyl carbazole, etc.; the alkenylaryl heterocyclic compounds, such as vinyl pyridine, vinyl methyl pyridine, vinyl quinoline, the diene-1,3 compounds, such as butadiene-1,3, methyl vinyl ketone, ethyl vinyl ketone, methyl isopropenyl ketone, N-vinyl imidazole, the vinyl as lactones, vinyl ketone, methyl isopropenyl ketone, the N-vinyl-2-oxazolidinones, maleic anhydride, dimethyl maleate, etc.

It is generally advantageous from an efficiency viewpoint that the various types of monomers used in the practice of this invention have no more than about 20 carbon atoms.

The chelating polymers made by the process of this invention are useful in recovering the metals which form chelates. These are disclosed in "Chemistry of Metal Chelates" by Martell and Calvin, published by Prentice-Hall (1956). Page 182 of this book has a table showing the periodic classification of chelate-forming metals. Those metals for which the process of this invention is particularly appropriate are those of Groups III and IV of the Periodic Table having atomic weights of at least 26, those of Groups V, VI and VII having atomic weights of at least 50, as well as magnesium and the metals of Group VIII. This invention is very useful in recovery of rare earths or lanthanides, and the actinides since they generally are found in very dilute concentrations and generally are otherwise very difficult to recover and separate. Specific metals for which this process is particularly appropriate include aluminum, titanium, vanadium, silicon, chromium, manganese, iron, cobalt, nickel, copper, zinc, magnesium, gallium, germanium, arsenic, ytterbium, zirconium, columbium, molybdenum, technetium, ruthenium, rhodium, palladium, silver, cadmium, indium, tin, antimony, hafnium, tantalum, tungsten, rhenium, osmium, iridium, platinum, gold, mercury, thallium, lead, bismuth, scandium, lanthanum, thorium, uranium, plutonium, etc.

While reference is sometimes made herein to recovery of the metal, it is intended to include recovery of the metal in the cationic form or in the form of its compound, or in accordance with whatever manner the metal exists in the chelate form and the state in which it is subsequently removed from the chelated polymer.

The following examples are given to illustrate better various methods for the practice of this invention and are not intended in any way as a limitation on the methods of practicing the invention. Parts and percentages are by weight unless otherwise indicated.

EXAMPLE I

Fifty parts of distilled water, 0.5 part of hydroxy apatite (0.005 to 0.2 micron size), 0.01 part of sodium dodecylbenzenesulfonate, 2.5 parts of commercial divinylbenzene (approximately 50% of DVB–50% ethylstyrene) and 39 parts of glycidylacrylate, 0.2 part of benzoyl peroxide are mixed in a suitable reaction flask and stirred for 10 hours at 80° C., and there is obtained a crosslinked polymer having a plurality of the repeating unit,

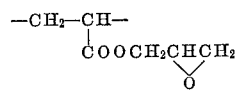

When divinylbenzene in the above procedure is replaced by diisopropenyl benzene, glycol dimethacrylate, diallylmaleate, or allyl acrylate similar crosslinked copolymers are obtained, and can be used with similar results in the following examples.

EXAMPLE II

Fifty parts of distilled water, 0.5 part of hydroxy apatite (0.005 to 0.2 micron size), 0.02 part of sodium dodecylbenzene sulfonate, 2.8 parts of commercial divinylbenzene (approximately 50% of DVB–50% ethyl styrene) and 43 parts of (a) glycidyl methacryate are mixed in a suitable reaction flask and heated for 10 hours at 80° C. and 5 hours at 90° C. and there is obtained a crosslinked polymer having repeating units of the structure

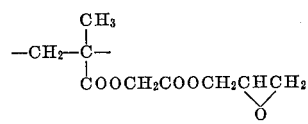

When the divinylbenzene in the above procedure is replaced by diisopropenyl benzene, glycol dimethacrylate, diallyl maleate, or allyl acrylate similar crosslinked polymers are obtained when other acryloxyepoxyalkanes, such as

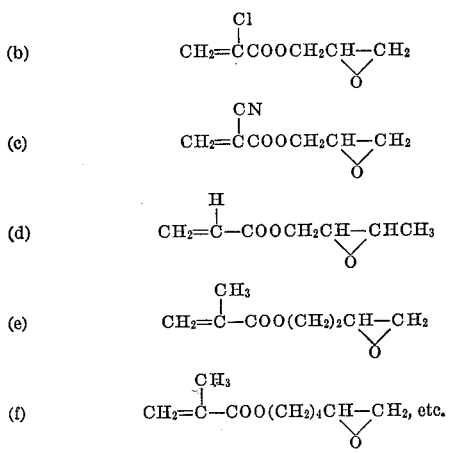

alkanes are substituted for the glycidyl methacrylate in this example, the corresponding crosslinked post-reactive polymers are obtained and can be used with similar results as shown in later examples.

EXAMPLE III

Fifty parts of styrene, 2.6 parts of commercial divinylbenzene (containing approximately 50% DVB–50% ethyl styrene), 1 part of 4,4-azobisisobutyronitrile, and 40 parts of glycidyl acrylate are heated at 45° C. for 12 hours, at 60° C. for 18 hours, at 80° C. for 18 hours, and 100° C. for 12 hours, following which the hard copolymer is ground in a dry atmosphere to small granules and washed with 3–100 part portions of dry heptane. When the divinylbenzene in the above procedure is replaced by diisopropenyl benzene, glycol dimethacrylate, diallyl maleate, or allyl acrylate, similar crosslinked polymers are obtained which can be used with similar results, as in the following examples. When the styrene is replaced by methyl methacrylate, vinyl acetate, acrylonitrile, vinyl chloride and the like, or the glycidyl acrylate is replaced by glycidyl methacrylate, α-cyanoglycidyl acrylate or γ-chloro glycidyl acrylate and the like, the corresponding crosslinked polymer is obtained which can be used with similar results as shown in some cases in later examples.

EXAMPLE IV

A mixture of 7.5 parts of iminoacetic acid, 12.8 parts of the polymer of Example I and 500 parts of dioxane are stirred at room temperature for 12 hours and 15 parts of tributyl amine added following which the mixture is heated for 12 hours at 70–80° C., and at the end of that time 2000 parts of water is added and there is obtained a chelating polymer having repeating units of the structure

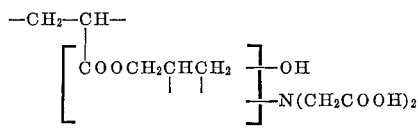

as the tributyl ammonium salts, which when immersed in a 10% NaOH solution are converted to the sodium salts

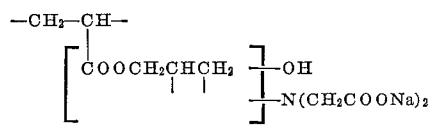

When KOH, LiOH, CsOH, or Ca(OH)$_2$ solutions are used, the corresponding salts are obtained, from which the free acid is readily obtained by treatment with inorganic acids, such as HCl, H$_2$SO$_4$, H$_3$PO$_4$, etc.

EXAMPLE V

The procedure of Example IV is repeated using 5.9 isovaline instead of the iminoacetic acid and there is obtained the corresponding polymer having repeating units of the structure

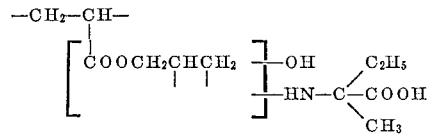

EXAMPLE VI

The procedure of Example IV is repeated using 6 parts of isovaline instead of the iminoacetic acid and there is obtained the corresponding polymer having repeating units of the structure

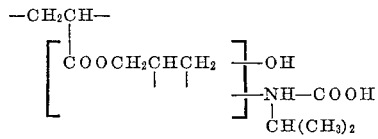

When 6 parts of norvaline are used instead of isovaline, the corresponding groups of the structure

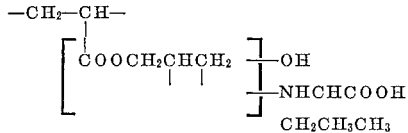

are obtained.

EXAMPLE VII

The procedure of Example IV is repeated using 5.85 parts of aspartic acid instead of the iminodiacetic acid, and there is obtained the corresponding polymer having repeating units of the structure,

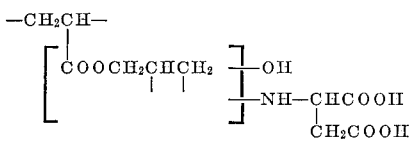

whose chelating properties are similar to those of the polymer of Example IV.

EXAMPLE VIII

When the procedure of Example IV is repeated five times using individually in place of the iminodiacetic acid, (a) 3.75 parts of glycine, (b) 4.4 parts of alanine, (c) 5.5 parts of aminobutyric acid, (d) 8.25 parts of leucine, and (e) 7.55 parts of phenyl glycine respectively, there are obtained the corresponding polymers having repeating units of the structures (a′) 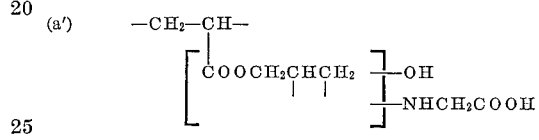

(b′) 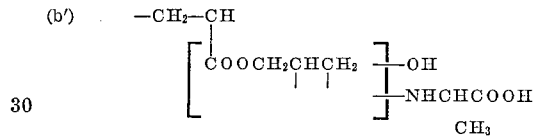

(c′) 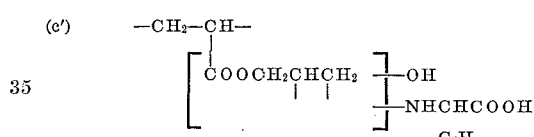

(d′) 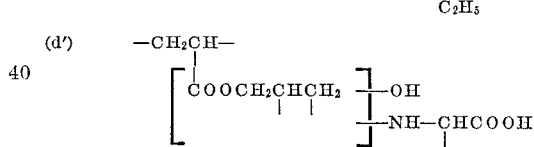

(e′) 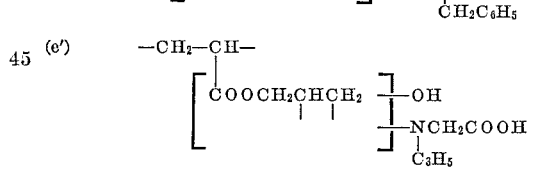

respectively, each of which has good chelating properties for metal ions.

EXAMPLE IX

When 7.25 parts of glutamic acid are substituted for the 5.85 parts of aspartic acid of Example VII, there is obtained the corresponding polymer having

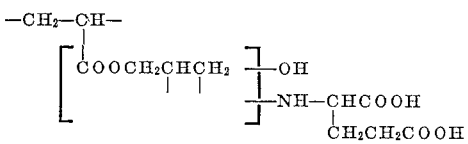

repeating units; and when 8.75 parts of aminopimelic acid are used instead of the aspartic acid, there is obtained the corresponding polymer having

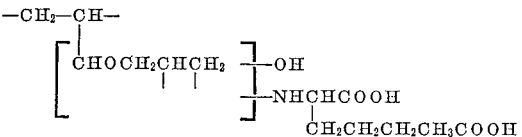

repeating units and both polymers have marked chelating properties for metal ions.

EXAMPLE X

When the procedure of Example IV is repeated using 5.95 parts of hydroxyethyl glycine instead of the iminoacetic acid there is obtained a polymer having repeating units of the structure

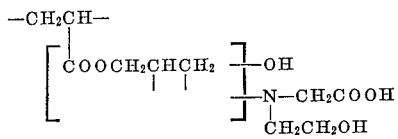

EXAMPLE XI

When the procedure of Example IV is repeated using 6.1 parts of cysteine instead of the iminoacetic acid there is obtained the corresponding polymer having groups of the structure,

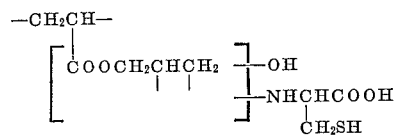

and when 7.45 parts of methionine are used instead of the cysteine, the corresponding polymer having

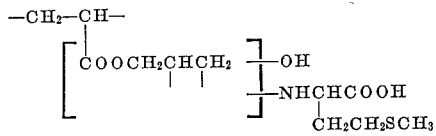

structures, is obtained; and when 5.3 parts of serine is used instead of cysteine, the polymer has repeating units of the structure

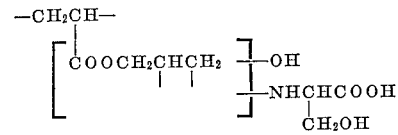

EXAMPLE XII

Fifteen parts of the polymer of Example I are completely immersed in 100 parts of concentrated ammonium hydroxide for 48 hours, and the polymers then removed by filtration and washed, by immersion in five 100 part portions of distilled water, and there is obtained a polymer having repeating units of the structure,

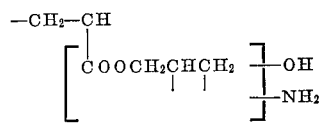

which exhibit coordination properties as such, and which also can be used as an anion exchange resin.

EXAMPLE XIII

To a solution containing 15 parts of chloroacetic acid, 14 parts of NaOH, and 100 parts of water there is added 15 parts of the polymer of Example XII and the mixture heated at 85–95° C. for 45–60 minutes, following which the mixture is cooled, the polymer removed by filtration and washed by immersion in five 100 part portions of distilled water. A polymer is obtained corresponding to the polymer of Example IV but in the form of the sodium salt.

EXAMPLE XIV

The procedure of Example IV is repeated using 7.9 parts lysine instead of imminoacetic acid and there is obtained a polymer having repeating units of the structure

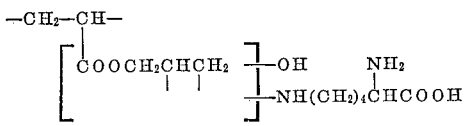

which has marked chelating properties, and when this polymer is treated with excess chloroacetic acid by the procedure of Example XIII, there is obtained a polymer having groups of the structure

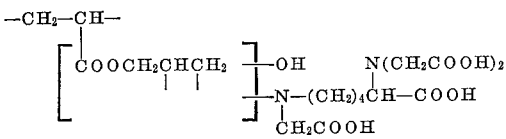

EXAMPLE XV

The procedures of Examples IV to XV are repeated using the glycidyl methacrylate polymer of Example II and there are obtained similar chelating polymers having instead of the

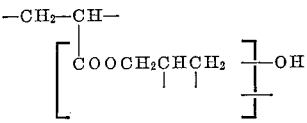

structure, the corresponding structure

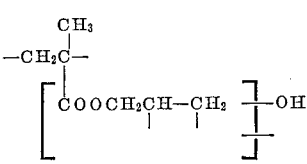

the procedure of Examples IV to XV are repeated using monomers b, c, d, e and f of Examples II, there are obtained similar chelating polymers having instead of the

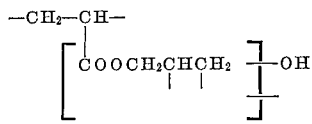

structure, the corresponding structures respectively (b) 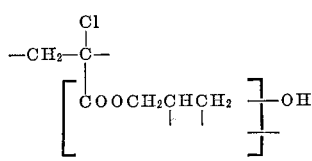

(c) 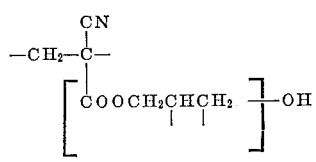

(d) 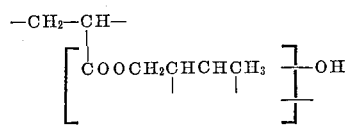

(e) 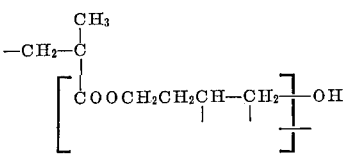

(f) 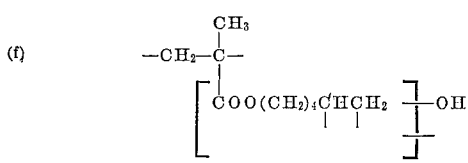

The chelating polymers of this invention as described above, have the repeating unit of the formula

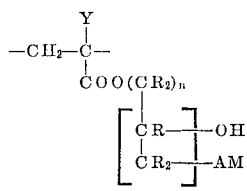

wherein $n$ has a value of 1 to 8, R is hydrogen or lower alkyl, Y is H, $CH_3$, Cl or CN, Am is a radical derived from the amino acids described above and can be defined as a monovalent aliphatic radical in which the valency is attached to an amino nitrogen therein. The radical can have a plurality of amino and carboxylic groups therein. One of the amino groups should be no farther than two carbon atoms from a carboxylic group. Preferably the amino acid radical should have no more than about 20 carbon atoms therein, advantageously no more than about 10 carbon atoms. The carboxylic group can be in the form of a free acid, the metal salts, the ammonium base salts, or the alkyl or aryl esters thereof, said alkyl and aryl ester groups having no more than about 8 carbon atoms therein.

As used herein, the term "lower alkyl," is intended to include such groups having no more than about 10 carbon atoms, such as methyl, ethyl, propyl, isopropyl, butyl, secondary butyl, amyl, secondary amyl, hexyl, heptyl, nonyl, decyl, secondary hexyl, secondary nonyl, benzyl, phenethyl, hydroxyethyl, hydroxypropyl, hydroxybutyl, hydroxyamyl, mercaptoethyl, mercaptomethyl, mercaptopropyl, mercaptoamyl, methylmercaptomethyl, methylmercaptoethyl, ethylmercaptomethyl, ethylmercaptoethyl, ethylmercaptopropyl, etc. groups.

The ammonium bases defined herein for M include the ammonium radical and various substituted ammonium radicals having various substituents thereon, such as alkyl groups, aryl groups, hydroxyalkyl groups, etc., preferably those having no more than about 21 carbon atoms, advantageously those having no more than about 10 carbon atoms. Typical examples of such substituted ammonium radicals include those derived from ammonia, methyl amine, dimethylamine, trimethyl amine, ethyl amine, diethyl amine, triethyl amine, propyl amine, butyl amine, dibutyl amine, tributyl amine, trihexyl amine, triheptyl amine, ethanol amine, diethanol amine, triethanol amine, isopropanol amine, diisopropanol amine, triisopropanol amine, methyl diethanol amine, dimethyl ethanol amine, morpholine, dimethyl benzyl amine, pyridine, ethyl pyridine, quinoline, isoquinoline, amino pyridine, guanidine, biguanidine, aniline, methyl aniline, dimethyl aniline, phenylene diamine, piperazine, triethylene diimine

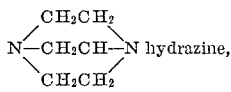 hydrazine, methyl hydrazine, symmetrical dimethyl hydrazine, phenyl hydrazine, amino imidazole, amino diazines, hydrazino triazines, etc.

Typical metals that can be used in substitution for M in the formulas given herein, include lithium, sodium, potassium, rubidium, cessium, calcium, strontium, barium, and the chelate-forming metals as disclosed in "Chemistry of Metal Chelates" by Martell and Calvin, published by Prentice-Hall (1956). Page 182 of this book shows the periodic classification of chelate-forming metals.

When preparing chelating polymers according to the process of this invention such as illustrated by the procedure of Example IV, the temperature is advantageously in the range of 0° to 150° C.; the reaction time is at least 5 minutes and up to 20 hours or more depending on the temperature, and where appropriate, the pressure; the amount of amino acid used is about 1–1.25% stoichiometric proportion for the number of Am radicals to be attached to oxirane radical in the polymer molecule. If each oxirane radical is to be reacted then the amount of amino acid would be 1–1.25% of stoichiometric based on the total number of oxirane groups present. In any case it is generally desirable to react at least 5% of the oxirane groups present.

Generally it is desirable to have an appropriate solvent, such as dioxane, diethyl glycol ether, diethyl diethylene glycol ether, tetrahydrofurane, dimethylformamide, dimethylacetamide, etc. It is also preferable to promote the reaction by alkaline conditions, advantageously by the presence of a tertiary amine, e.g. tributyl amine, triamyl amine, triethyl amine, pyridine, quinoline, N,N-dimethylaniline, dimethyl sulfoxide, tetramethyl urea, etc.

The polymers of this invention can be used as chelating resins to recover and to separate chelating metals by various methods, including those described in my copending application, Ser. No. 28,563, filed May 12, 1960, now abandoned.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A crosslinked polymer having a plurality of repeating units of the formula

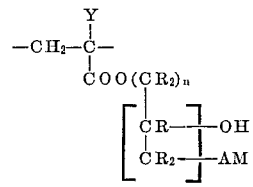

wherein Y represents a member selected from the class of H, $CH_3$, Cl and CN, $n$ represents a numerical value of 1 to 8, R represents H and a lower alkyl group containing no more than ten carbon atoms and Am is a monovalent radical having said valency attached to an aminonitrogen therein, having an aliphatic group therein, said aliphatic groups having at least one amino group and at least one carboxylic group attached thereto, having an amino group no farther than two carbon atoms from a carboxylic group, having no more than about 20 carbon atoms therein, said carboxylic group being in the form of a radical selected from the class consisting of the free acid, metal salts thereof, and ammonium base salts thereof.

2. A polymer of claim 1 which is crosslinked with a cross-linking agent selected from the class consisting of divinyl benzene, allyl acrylate, allyl methacrylate, glycol diacrylate, glycol dimethacrylate, diallyl maleate, diallyl fumarate, and diallyl itaconate.

3. A polymer of claim 1 in which said repeating unit has the formula

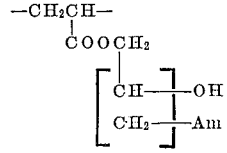

4. A polymer of claim 1 in which said repeating unit has the formula

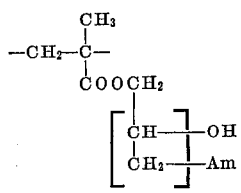

5. A polymer of claim 1 in which Am is

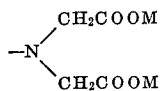

wherein M is selected from the class consisting of hydrogen, ammonium bases and metals.

6. A polymer of claim 3 in which Am is

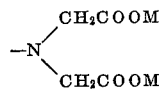

7. A polymer of claim 4 in which Am is

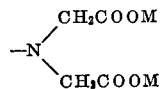

8. A polymer of claim 3 in which the polymer is crosslinked with divinyl benzene.

9. A polymer of claim 4 in which the polymer is crosslinked with divinyl benzene.

10. A polymer of claim 1 in which other repeating units are in the polymer molecule said other repeating units being derived from a monovinyl monomer selected from the class consisting of styrene, acrylonitrile, vinylacetate, vinylchloride, ethyl acrylate and methyl methacrylate by copolymerization of said monovinyl monomer with an oxirane acrylic ester.

References Cited

UNITED STATES PATENTS 2,875,162  2/1959  Morris _____ 260—2.1
3,310,530  3/1967  White _____ 260—47

OTHER REFERENCES

Helfferich Ion Exchange, McGraw-Hill, New York, 1962, p. 41.

WILLIAM H. SHORT, *Primary Examiner.*

M. GOLDSTEIN, *Assistant Examiner.*